US010363929B2

(12) United States Patent
Yamakado et al.

(10) Patent No.: US 10,363,929 B2
(45) Date of Patent: Jul. 30, 2019

(54) VEHICLE AUTOMATIC TRAVEL CONTROL DEVICE AND VEHICLE AUTOMATIC TRAVEL METHOD

(71) Applicant: ISUZU MOTORS LIMITED, Tokyo (JP)

(72) Inventors: Ryuu Yamakado, Fujisawa (JP); Shinichi Ishiguro, Kawasaki (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 15/531,389

(22) PCT Filed: Nov. 6, 2015

(86) PCT No.: PCT/JP2015/081324
§ 371 (c)(1),
(2) Date: May 26, 2017

(87) PCT Pub. No.: WO2016/084583
PCT Pub. Date: Jun. 2, 2016

(65) Prior Publication Data
US 2017/0327113 A1 Nov. 16, 2017

(30) Foreign Application Priority Data
Nov. 27, 2014 (JP) ................ 2014-240489

(51) Int. Cl.
*G01P 3/50* (2006.01)
*B60W 10/02* (2006.01)
(Continued)

(52) U.S. Cl.
CPC .......... *B60W 30/143* (2013.01); *B60W 10/02* (2013.01); *B60W 10/06* (2013.01);
(Continued)

(58) Field of Classification Search
CPC ......... B60W 30/143; B60W 30/18072; B60W 10/02; B60W 10/06; B60W 10/10;
(Continued)

(56) References Cited

U.S. PATENT DOCUMENTS

2005/0230161 A1  10/2005  Terui
2010/0324795 A1  12/2010  Tsumori et al.
(Continued)

FOREIGN PATENT DOCUMENTS

CN  1675084 A  9/2005
CN  101687508 A  3/2010
(Continued)

OTHER PUBLICATIONS https://web.archive.org/web/20130413204706/https://en.wikipedia.org/wiki/Rolling_resistance, 2013. (Year: 2013).*
(Continued)

*Primary Examiner* — Aaron L Troost
(74) *Attorney, Agent, or Firm* — Procopio, Cory, Hargreaves & Savitch LLP

(57) ABSTRACT

An end point speed at an end point of inertial travel that a vehicle is controlled to perform in a short section $l_i$ is calculated using a weight, a start point speed, slopes, and a horizontal distance, based on a change in energy of the vehicle or an acceleration of the vehicle in the short section. In a case where the calculated end point speed is within a speed range, the vehicle is controlled to perform inertial travel in the short section. In this way, the speed of the vehicle in a case where the vehicle is controlled to perform inertial travel can be accurately calculated and the vehicle can be prevented from deviating from a set speed range at an early stage even when controlled to perform inertial travel, thereby increasing the distance traveled by inertial travel and effectively increasing fuel economy.

13 Claims, 6 Drawing Sheets

(51) Int. Cl.
*B60W 10/06* (2006.01)
*B60W 10/10* (2012.01)
*B60W 30/14* (2006.01)
*B60W 30/18* (2012.01)
*B60W 40/13* (2012.01)
*B60W 50/00* (2006.01)
*B60W 40/076* (2012.01)
*B60W 40/105* (2012.01)

(52) U.S. Cl.
CPC ...... *B60W 10/10* (2013.01); *B60W 30/18072* (2013.01); *B60W 40/076* (2013.01); *B60W 40/105* (2013.01); *B60W 40/13* (2013.01); *B60W 50/0097* (2013.01); *G01P 3/50* (2013.01); *B60W 2510/20* (2013.01); *B60W 2520/10* (2013.01); *B60W 2530/10* (2013.01); *B60W 2540/10* (2013.01); *B60W 2540/12* (2013.01); *B60W 2540/16* (2013.01); *B60W 2550/142* (2013.01); *B60W 2710/021* (2013.01); *B60W 2710/0677* (2013.01); *B60W 2710/10* (2013.01); *B60W 2720/10* (2013.01); *B60W 2720/103* (2013.01); *Y02T 10/52* (2013.01); *Y02T 10/76* (2013.01)

(58) Field of Classification Search
CPC .. B60W 40/076; B60W 40/105; B60W 40/13; B60W 2510/20; B60W 2520/10; B60W 2530/10; B60W 2540/10; B60W 2540/12; B60W 2540/16; B60W 2550/142; B60W 2710/021; B60W 2710/0677; B60W 2710/10; B60W 2720/10; G01P 3/50
See application file for complete search history.

(56) References Cited

U.S. PATENT DOCUMENTS

| 2012/0083985 | A1* | 4/2012 | Johansson | B60W 30/143 701/93 |
|---|---|---|---|---|
| 2013/0096792 | A1 | 4/2013 | Maier et al. | |
| 2014/0088847 | A1 | 3/2014 | Abdul-Rasool et al. | |
| 2014/0121889 | A1 | 5/2014 | Sodergren et al. | |
| 2015/0066327 | A1* | 3/2015 | Syed | B60W 30/143 701/93 |
| 2015/0321670 | A1* | 11/2015 | Johansson | B60W 50/0097 701/94 |

FOREIGN PATENT DOCUMENTS

| DE | 102012025036 A1 | 6/2014 |
|---|---|---|
| EP | 2718161 A1 | 4/2014 |
| JP | H08-202989 A | 8/1996 |
| JP | 2009-006835 A | 1/2009 |
| JP | 2011-016465 A | 1/2011 |
| JP | 2012-219986 A | 11/2012 |
| JP | 2014083896 A | 5/2014 |
| JP | 2014520703 A | 8/2014 |
| WO | 2012169962 A1 | 12/2012 |
| WO | 2014003653 A1 | 1/2014 |

OTHER PUBLICATIONS https://web.archive.org/web/20130209122027/https://en.wikipedia.org/wiki/Drag_(physics), 2013. (Year: 2013).*
https://www.bing.com/videos/search?q=how+to+calculate+final+velocity+from+conservation+of+energy&qpvt=how+to+calculate+final+velocity+from+conservation+of+energy&view=detail&mid=D4A45A87C7FEB07CC1BED4A45A87C7FEB07CC1BE&&FORM=VRDGAR, 2013. (Year: 2013).*
International Search Report and Written Opinion for PCT App No. PCT/JP2015/081324 dated Feb. 9, 2016, 10 pgs.
Extended European Search Report for EP App No. 15863506.0 dated Jul. 9, 2018, 9 pgs.
Notification of Reasons for Refusal for JP App No. 2014-240489 dated Jul. 9, 2018, 6 pgs.
First Office Action for related CN App No. 201580064268.4 dated Sep. 4, 2018, 19 pgs.

* cited by examiner

VEHICLE AUTOMATIC TRAVEL CONTROL DEVICE AND VEHICLE AUTOMATIC TRAVEL METHOD

CROSS-REFERENCE TO RELATED APPLICATIONS

This application is a U.S. National Stage entry of PCT Application No. PCT/JP2015/081324, filed on Nov. 6, 2015, which claims priority to Japanese Patent Application No. 2014-240489, filed Nov. 27, 2014, the contents of which are incorporated herein by reference.

TECHNICAL FIELD

The present invention relates to a vehicle automatic travel control device and a vehicle automatic travel method, and more specifically, to a vehicle automatic travel control device and a vehicle automatic travel method whereby a speed of a vehicle can be accurately calculated in a case where the vehicle is controlled to perform inertial travel, the vehicle can be prevented from deviating from a set speed range at an early stage even when controlled to perform the inertial travel, and a distance to be traveled by the inertial travel can be increased, so that fuel economy can be effectively improved.

BACKGROUND ART

When a vehicle is controlled to perform automatic travel control (auto cruise control), fuel economy is improved if a frequency of inertial travel is increased.

Therefore, as disclosed in JP-A-2012-219986 (Patent Document 1), a device for controlling the inertial travel of the vehicle so that a vehicle speed falls within a speed range, which is faster than a lower limit speed set to be slower than a preset target speed and is slower than an upper limit speed set to be faster than the target speed, has been suggested.

According to the device, when a slope changes from positive to negative, i.e., when the vehicle approaches a descending road, the inertial travel is enabled to start. Also, when the slope becomes positive and a slope change ratio becomes negative, it is determined that the vehicle is adjacent to a top. Also, a speed of the vehicle when controlled to perform the inertial travel in the vicinity of the top is estimated using a map in which a relationship between a shape of a travel road such as a slope, a slope change ratio and the like, a current vehicle speed, and a vehicle weight is preset. Also in a case where the estimated speed becomes equal to or greater than the lower limit speed, the inertial travel is enabled to start.

However, according to the device, even when the vehicle is controlled to perform the inertial travel, the speed of the vehicle may be decreased to become less than the set lower limit speed at an early stage due to influences of an air resistance, a rolling resistance and a slope resistance to be applied to the vehicle, depending on the slope of the descending road.

Also, according to the device, there is a case where the vehicle is not adjacent to the top even when the slope becomes positive and the slope change ratio becomes negative. In this case, even when the inertial travel is enabled to start, the speed of the vehicle decreases and becomes less than the set lower limit speed at an early stage.

Like this, if it is determined whether or not to start the inertial travel only based on the situations of the travel road such as the slope, the slope change ratio and the like of the travel road, a situation where the vehicle speed becomes less than the set lower limit speed at an early stage occurs in the above case. When this situation occurs, more fuels are consumed so as to release the inertial travel and to return to the target speed by consuming the fuel, so that the fuel economy is further deteriorated.

PRIOR ART REFERENCE

Patent Reference

Patent Document 1: JP-A-2012-219986

DISCLOSURE OF THE INVENTION

Problems to be Solved

The present invention has been made in view of the above situations, and an object thereof is to provide a vehicle automatic travel control device and a vehicle automatic travel method whereby a speed of a vehicle can be accurately calculated when the vehicle is controlled to perform inertial travel, the vehicle can be prevented from deviating from a set speed range at an early stage even when controlled to perform the inertial travel, and a distance to be traveled by the inertial travel can be increased, so that fuel economy can be effectively improved.

Means for Solving the Problems

In order to solve the above-described problem, there is provided a vehicle automatic travel control device provided on a vehicle having an internal combustion engine and controlling the vehicle to automatically travel in a short section, in which a horizontal distance from a start point to a end point in front of the vehicle is preset, while maintaining a speed of the vehicle within a speed range which is faster than a lower limit speed set to be slower than a preset target speed and is slower than an upper limit speed set to be faster than the target speed, the vehicle automatic travel control device including: end point speed calculation means for calculating an end point speed, which is a vehicle speed at the end point in a case where it is assumed that the vehicle is controlled to perform inertial travel in the short section, based on a change in energy of the vehicle or an acceleration of the vehicle in the short section; and speed determination means for determining whether the calculated end point speed falls within the speed range, wherein the vehicle is controlled to perform the inertial travel in the short section in a case where the end point speed falls within the speed range.

Further, in order to solve the above-described problem, there is provided a vehicle automatic travel method in which a vehicle having an internal combustion engine is controlled to automatically travel in a short section, in which a horizontal distance from a start point to an end point in front of the vehicle is preset, while maintaining a speed of the vehicle within a speed range that is faster than a lower limit speed set to be slower than a preset target speed and is slower than an upper limit speed set to be faster than the target speed, the vehicle automatic travel method including: calculating an end point speed at the end point in a case where it is assumed that the vehicle is controlled to perform inertial travel in the short section, based on a change in energy of the vehicle or an acceleration of the vehicle in the short section; determining whether the calculated end point speed falls within the speed range; and controlling the vehicle to perform the inertial travel in the short section in a case where the end point speed falls within the speed range.

Effects of the Invention

According to the vehicle automatic travel control device and the vehicle automatic travel method of the present invention, it is possible to accurately calculate the end point speed at the end point in a case where it is assumed that the vehicle is controlled to perform inertial travel in the short section, based on any one of the energy conservation law and the motion equation. Thereby, even when the vehicle is controlled to perform the inertial travel, it is possible to prevent the vehicle from deviating from the set speed range at an early stage, thereby increasing the distance to be traveled by the inertial travel and effectively improving the fuel economy.

Also, according to the vehicle automatic travel control device and the vehicle automatic travel method, also in a case of a descending road or ascending road of a long distance, it is possible to accurately calculate the end point speed at the end point by acquiring the vehicle weight, the start point speed at the start point, the slope and the horizontal distance. Also, even when a plurality of short sections is continuous, it is possible to accurately calculate the end point speed at the end point in each short section. That is, since the determination is made on the assumption that the vehicle is controlled to perform the inertial travel over a longer distance than the related art, it is possible to advantageously improve the fuel economy.

MODE FOR CARRYING OUT THE INVENTION

Figure 1:
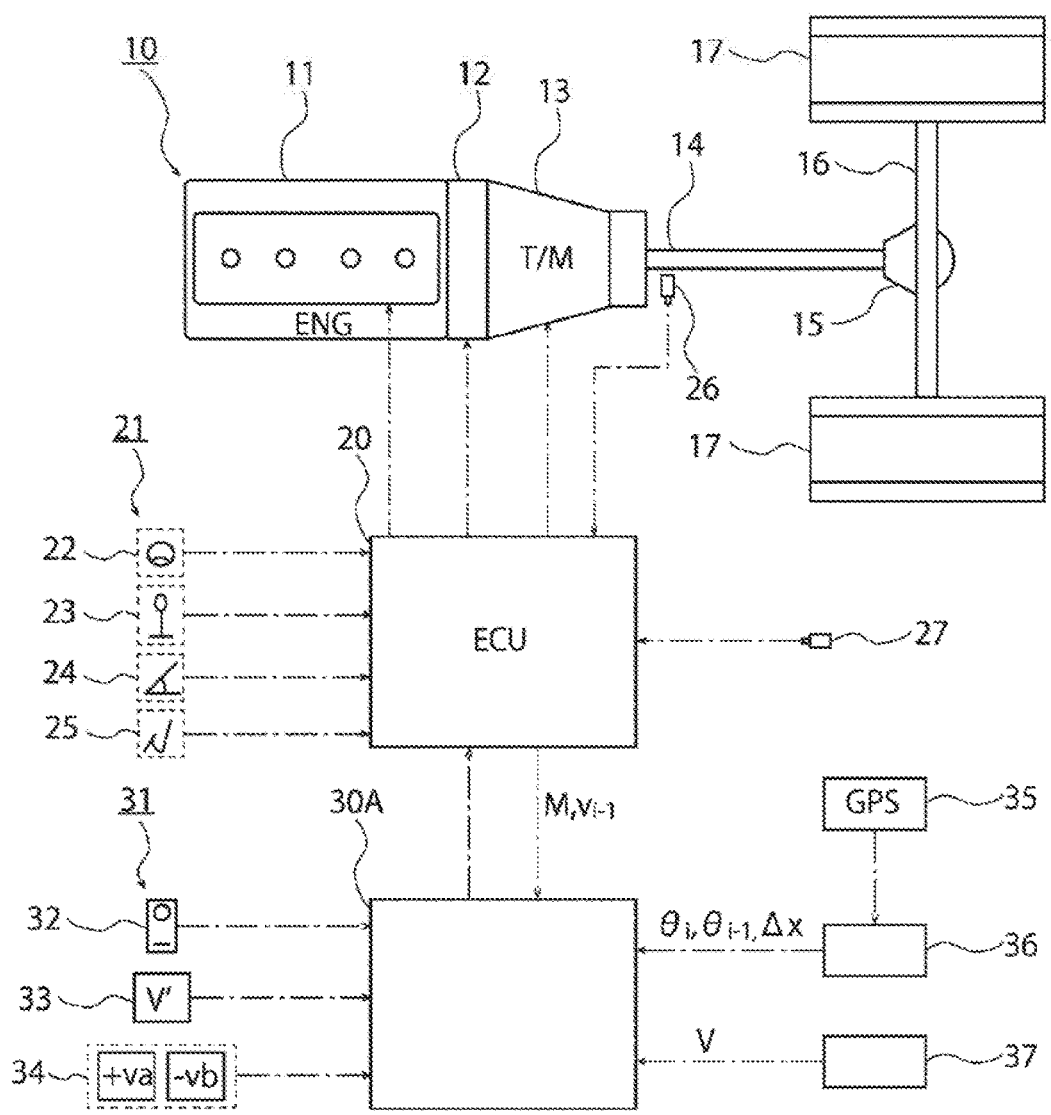
FIG. 1 illustrates an illustrative embodiment of a vehicle automatic travel control device of the present invention.

Hereinafter, a vehicle automatic travel control device and a vehicle automatic travel method of the present invention will be described. FIG. 1 exemplifies a configuration of an automatic travel control device 30 in accordance with an illustrative embodiment of the present invention. The automatic travel control device 30 causes a vehicle 10 having an engine 11 mounted thereto to perform inertial travel while controlling a speed of the vehicle to fall within a preset speed range R1.

The vehicle 10 includes a control device 20 that controls output of a Diesel engine (hereinafter, referred to as 'engine') 13, disconnection/connection of a clutch 12 and gear change of a transmission 13, and an automatic travel control device 30 that sends a command to the control device 20 upon automatic travel.

Upon normal travel of the vehicle 10, the control device 20 performs control, in correspondence to operations of a steering wheel 22, a shift lever 23, an accelerator pedal 24 and a brake pedal 25 of an operation device 21 by a driver and detected values of a vehicle speed sensor 26 and an acceleration sensor 27 of diverse sensors 26. Specifically, the control device 20 controls the output of the Diesel engine (hereinafter, referred to as 'engine') 11, the disconnection/connection of the clutch 12 and the gear change of the transmission 13, and transmits power output from the engine 11 from a crankshaft (not shown) to the transmission 13 via the clutch 12. Also, the control device transmits the power from the transmission 13 to a differential 15 through an impulsion shaft 14, and also transmits the power from the differential 15 to driving wheels 17 through a driving shaft 16, thereby causing the vehicle to travel.

Also, upon the automatic travel (auto cruise) of the vehicle 10, the automatic travel control device 30 transmits a command to the control device 20, in correspondence to operations of an automatic travel switch 32, a target vehicle speed setting device 33 and an increase/decrease value setting device 34 of an automatic travel setting device 31 by the driver, and the control device 20 having received the command controls the output of the engine 11, the disconnection/connection of the clutch 12 and the gear change of the transmission 13 and performs the automatic travel.

In an operation upon start of the automatic travel, the driver operates the target vehicle speed setting device 33 to set a target speed V1 of the vehicle 10 upon the automatic travel. Also, the driver operates the increase/decrease value setting device 34 to set a speed increase value +va and a speed decrease value −vb upon the automatic travel. The speed increase value +va and the speed decrease value −vb are set, so that the speed increase value +va and the speed decrease value −vb are respectively added to the target speed V1 and thus a speed range R1, which is slower than an upper limit speed V2 set to be faster than the target speed V1 and is faster than a lower limit speed V3 set to be slower than the target speed V1, is set.

In the meantime, the target speed V1, the speed increase value +va, and the speed decrease value −vb can be individually set to any values. For example, when the target speed V1 is set to 80 km/h, the speed increase value +va is set to +10 km/h and the speed decrease value −vb is set to −5 km/h, the upper limit speed V2 is 90 km/h and the lower limit speed V3 is 75 km/h. In the meantime, the speed increase value +va and the speed decrease value −vb may be set to 0 km/h.

When the driver turns on the automatic travel switch 32, the automatic travel starts, and when the driver turns off the automatic travel switch or operates the accelerator pedal 24 and the brake pedal 25 of the operation device 21, the automatic travel is over.

Also, in the control upon the automatic travel, the automatic travel control device 30 selects target speed maintaining travel in which the vehicle travels while maintaining the target speed V1 with the output of the engine 11 by combusting the fuel and inertial travel in which the vehicle travels while maintaining the speed range R1 by disconnecting the clutch 12 or setting the transmission 13 to a neutral state. In the meantime, upon the inertial travel, the engine 11 is preferably maintained at an idle state. However, upon the inertial travel, the engine 11 may be stopped.

The inertial travel is advantageous to improvement on the fuel economy because only the fuel for the engine idling is to be consumed. In the meantime, upon the start of the inertial travel, in a case where the speed does not fall within the speed range R1 at an early stage and the vehicle is switched to the target speed maintaining travel, the fuel is further consumed uselessly, so that the fuel economy may be deteriorated.

Figure 2:
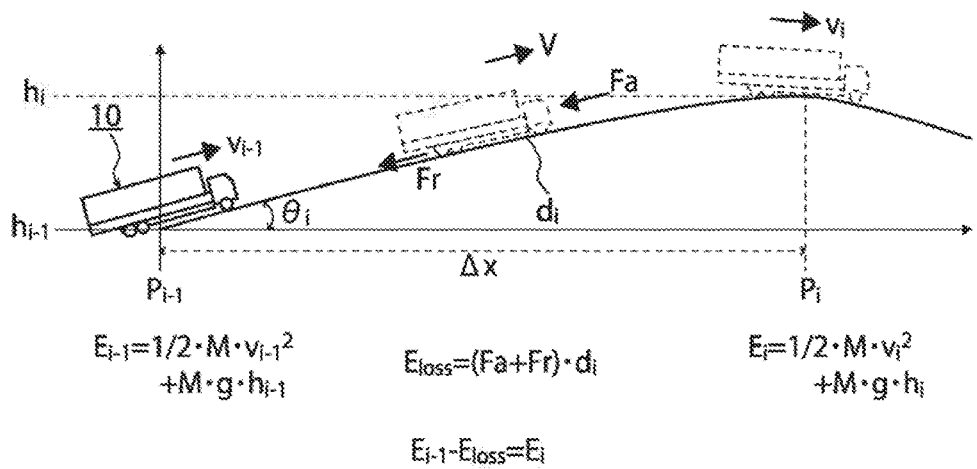
FIG. 2 illustrates an example of means for calculating an end point speed in the automatic travel control device of FIG. 1.
Figure 3:
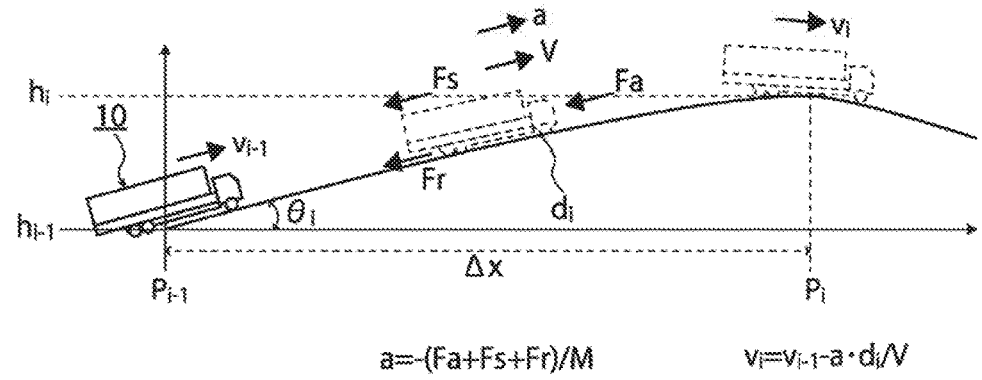
FIG. 3 illustrates another example of the means for calculating the end point speed in the automatic travel control device of FIG. 1.

Therefore, the automatic travel control device 30 of the present invention includes, as end point speed calculation means, any one of means for calculating an end point speed $v_i$ from a change in energy E of the vehicle 10 in a short section $l_i$ shown in FIG. 2 and means for calculating an acceleration a of the vehicle 10 in a short section $l_i$ shown in FIG. 3 and calculating the end point speed $v_i$.

The automatic travel control device 30 includes, as speed determination means, means for determining whether the end point speed $v_i$ falls within the speed range R1, and causes the vehicle 10 to perform the inertial travel in the short section $l_i$ in a case where the end point speed $v_i$ falls within the speed range R1.

Also, the automatic travel control device 30 includes means for acquiring a parameter that is to be used in the end point speed calculation means, and is configured to acquire a weight M of the vehicle 10 calculated by the control device 20, as weight acquisition means, and to acquire a detected value of the vehicle speed sensor 26, as start point speed acquisition means. Also, the automatic travel control device 30 includes a navigation system 36, which performs communication with a global positioning system (GPS) 35, and a drive recorder 37, as slope acquisition means.

The control device 20 calculates a weight M of the vehicle 10 when changing a shift stage of the transmission 13. Means for calculating the weight M is not particularly limited. For example, means for calculating a driving force of the vehicle 10 based on detected values of the vehicle speed sensor 26 and the acceleration sensor 27 and calculating the weight from the driving force or means for acquiring the weight from a pressure of an air suspension may be exemplified.

The navigation system 36 is a device that acquires a current position of the vehicle 10 and outputs a front road situation by sequentially performing communication with the global positioning system 35 and referring to three-dimensional road data stored in advance. The navigation system 36, as the slope acquisition means, refers to the three-dimensional road data to acquire a slope $\theta_i$ of a short section $l_i$ in which a horizontal distance $\Delta x$ from a start point $P_{i-1}$ (current position) to an end point $P_i$ is preset and a slope $\theta_{i-1}$ of a previous short section $l_{i-1}$ in which an end point is the start point $P_{i-1}$, and transmits the slope $\theta_i$, the slope $\theta_{i-1}$ a and the horizontal distance $\Delta x$ to the automatic travel control device 30. In the meantime, the slope acquisition means is not limited thereto. For example, means for acquiring the same from the three-dimensional road data stored in the drive recorder 37 may be exemplified.

The slope $\theta_i$ and the slope $\theta_{i-1}$ acquired from the navigation system 36 are expressed by a percent indicating what meters the section is vertically raised with respect to a horizon 100 m. For example, when the section is raised by 1 m, the slope is indicated by 1%. In the meantime, the present invention is not limited thereto, and an angle (°) or a radian (rad) may be used.

The drive recorder 37 is a device that stores a travel situation including a travel road, on which the vehicle 10 has traveled, and a speed upon the travel.

As shown in FIG. 2, when it is assumed that the vehicle 10 is controlled to perform the inertial travel in the short section $l_i$, the end point speed $v_i$ is based on a change in energy of the vehicle 10 in the short section $l_i$. That is, the end point speed $v_i$ is calculated from a relationship between a start point energy $E_{i-1}$ of the vehicle 10 at the start point $P_{i-1}$, an end point energy $E_i$ of the vehicle 10 at the end point $P_i$ and a loss energy $E_{loss}$ to be lost from the start point $P_{i-1}$ to the end point $P_i$, based on the energy conservation law.

The start point energy $E_{i-1}$ is expressed by the potential energy and the kinetic energy using a weight M, a start point speed $v_{i-1}$, and a start point altitude $h_{i-1}$ at the start point $P_{i-1}$. In the meantime, the start point altitude $h_{i-1}$ is expressed by an equation (4).

[equation 4]

$$h_{i-1} = \Delta x \cdot \frac{\theta_{i-1}}{100} \quad (4)$$

The end point energy $E_i$ is expressed by the potential energy and the kinetic energy using the weight M, the end point speed $v_i$ and an end point altitude $h_i$ at the end point $P_i$. In the meantime, the end point altitude $h_i$ is expressed by an equation (5).

[equation 5]

$$h_i = \Delta x \cdot \frac{\theta_i}{100} \quad (5)$$

From the start point $P_{i-1}$ to the end point $P_i$, the kinetic energy is reduced due to the air resistance and the rolling resistance. That is, since the loss energy $E_{loss}$ is equivalent to an amount of work resulting that the air resistance force Fa and the rolling resistance force Fr are applied to the vehicle 10, it is expressed by multiplying the air resistance force Fa and the rolling resistance force Fr by a travel distance $d_i$ in the short section $l_i$.

The air resistance force Fa is expressed by an equation (6) where an average speed of the vehicle 10 is denoted with V, an air density is denoted with ρ, a frontal projected area of the vehicle 10 is denoted with A, an air resistance coefficient is denoted with $C_d$ and a constant is denoted with λ.

[equation 6]

$$Fa = \frac{1}{2} \cdot \rho \cdot C_d \cdot A \cdot V^2 \cdot g = \lambda \cdot V^2 \cdot g \quad (6)$$

That is, the air density ρ, the frontal projected area A of the vehicle 10 and the air resistance coefficient $C_d$ can be preset and replaced with the constant λ. In the meantime, when means for acquiring a wind speed of headwind is provided, a wind speed is added to the average speed V, instead of the square of the average speed V, and a square of the resultant speed thereof may be used.

The rolling resistance force Fr is expressed by an equation (7) where a rolling resistance coefficient is denoted with μ and the gravity acceleration is denoted with g.

[equation 7]

$$Fr = \mu \cdot M \cdot g \cdot \cos\left(\tan^{-1}\frac{\theta_i}{100}\right) \tag{7}$$

The travel distance $d_i$ of the vehicle 10 in the short section $l_i$ is expressed by an equation (8).

[equation 8]

$$d_i = \frac{\Delta x}{\cos\left(\tan^{-1}\frac{\theta_i}{100}\right)} = \Delta x \cdot \sqrt{1 + \left(\frac{\theta_i}{100}\right)^2} \tag{8}$$

From the relation ($E_{i-1} - E_{loss} = E_i$) among the start point energy $E_{i-1}$, the end point energy $E_i$ and the loss energy $E_{loss}$ based on the energy conservation law, the end point speed $v_i$ is expressed by an equation (1).

[equation 1]

$$v_i = \sqrt{\frac{2}{M} \cdot \left\{\frac{1}{2} \cdot M \cdot v_{i-1}^2 + M \cdot g \cdot \Delta x \cdot \frac{\theta_{i-1}}{100} - M \cdot g \cdot \Delta x \cdot \frac{\theta_i}{100} - \left[\lambda \cdot v_{i-1}^2 \cdot g + \mu \cdot M \cdot g \cdot \cos\left(\tan^{-1}\frac{\theta_i}{100}\right)\right] \cdot \Delta x \cdot \sqrt{1 + \left(\frac{\theta_i}{100}\right)^2}\right\}} \tag{1}$$

In the meantime, herein, it is assumed that the average speed V is constant when the vehicle 10 is controlled to perform the inertial travel in the short section $l_i$, and the average speed V in the equation (6) is considered as the start point speed $v_{i-1}$ at the start point $P_{i-1}$. Regarding the average speed V, speeds when the vehicle 10 is controlled to perform the inertial travel may be sequentially stored in the drive recorder 37 and an average value of the stored speeds may be used. Also, an average value of speeds when the vehicle 10 is controlled to perform the inertial travel by an experiment or a test may be used as the average speed V. Alternatively, in the case of an ascending road, an average value of the start point speed $v_{i-1}$ and the lower limit speed V3 may be used as the average speed V, and in the case of a descending road, an average value of the start point speed $v_{i-1}$ and the upper limit speed V2 may be used as the average speed V.

Also, when a plurality of the short sections $l_i$ is continuous, the average speed may be calculated while assuming an altitude $h_0$ at a start point $P_0$ in a first short section $l_i$ as zero.

As shown in FIG. 3, when it is assumed that the vehicle 10 is controlled to perform the inertial travel in the short section $l_i$, the end point speed $v_i$ can be calculated by integrating the acceleration a of the vehicle 10 in the short section $l_i$ while using the start point speed $v_{i-1}$ as an integral constant. That is, since the air resistance force Fa, the rolling resistance force Fr and the slope resistance force Fs, which are to be applied to the vehicle 10, are equal to a change in momentum of the vehicle 10, the end point speed is calculated based on the motion equation.

Herein, the slope resistance force Fs is expressed by an equation (9).

[equation 9]

$$Fs = M \cdot g \cdot \sin\left(\tan^{-1}\frac{\theta_i}{100}\right) \tag{9}$$

Therefore, since the change in momentum from the start point $P_{i-1}$ to the end point $P_i$ is expressed by (Fa+Fr+Fs=M·a), the end point speed is expressed by an equation (2).

[equation 2]

$$v_i = \sqrt{v_{i-1}^2 - \left\{\frac{\lambda \cdot v_{i-1}^2 \cdot g + \mu \cdot M \cdot g \cdot \cos\left(\tan^{-1}\frac{\theta_i}{100}\right) + M \cdot g \cdot \sin\left(\tan^{-1}\frac{\theta_i}{100}\right)}{M}\right\} \cdot \frac{\Delta x \cdot \sqrt{1 + \left(\frac{\theta_i}{100}\right)^2}}{v_{i-1}}} \tag{2}$$

In the meantime, likewise, it is herein assumed that the average speed V is constant when the vehicle 10 is controlled to perform the inertial travel in the short section $l_i$, and the average speed V in the equation (6) is considered as the start point speed $v_{i-1}$ at the start point $P_{i-1}$.

Figure 4:
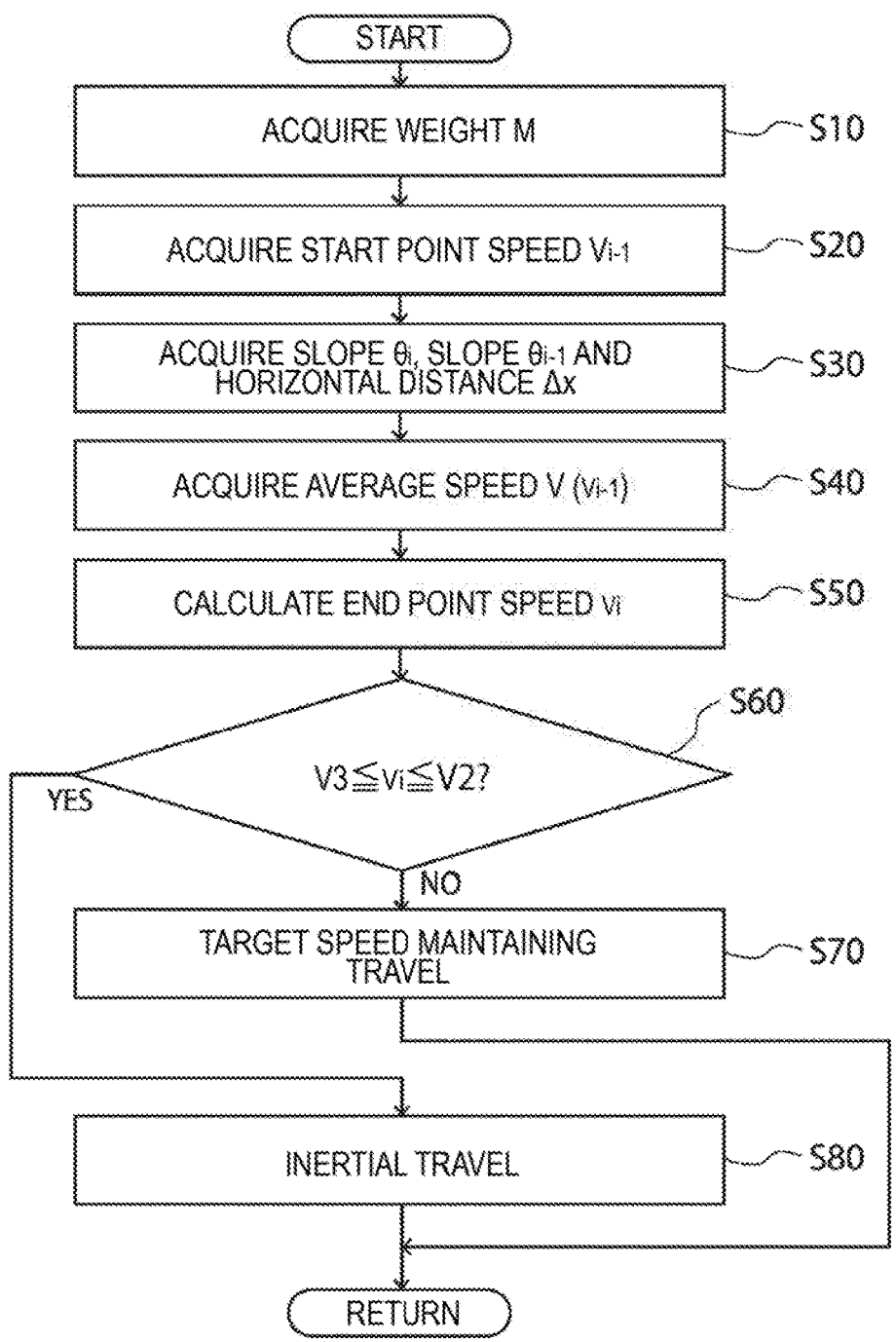
FIG. 4 is a flowchart depicting an illustrative embodiment of a vehicle automatic travel method of the present invention.

An operation of the automatic travel control device 30, i.e., an automatic travel method of the vehicle 10 is described with reference to a flowchart of FIG. 4.

First, in step S10, the automatic travel control device 30 acquires the weight M of the vehicle 10 from the control device 20. Then, in step S20, the automatic travel control device 30 acquires the start point speed $v_{i-1}$, which is the detected value of the vehicle speed sensor 26, via the control device 20. Then, in step S30, the automatic travel control device 30 acquires the slope $\theta_i$ of the short section $l_i$, the slope $\theta_{i-1}$ of the previous short section $l_{i-1}$ of the short section $l_i$ and the horizontal distance $\Delta x$ from the navigation system 36. Then, in step S40, the automatic travel control device 30 acquires the start point speed $v_{i-1}$ while assuming that the average speed V in a case where the vehicle 10 is controlled to perform the inertial travel in the short section $l_i$ is constant.

Then, in step S50, the automatic travel control device 30 calculates the end point speed $v_i$ from the equation (1) or the equation (2) by using the weight M, the start point speed $v_{i-1}$, the slope $\theta_i$, the slope $\theta_{i-1}$ and the horizontal distance $\Delta x$.

Then, in step S60, the automatic travel control device 30 determines whether the end point speed $v_i$ calculated in step S50 falls within the speed range R1, i.e., whether the end point speed $v_i$ is equal to or greater than the lower limit speed V3 and is equal to or smaller than the upper limit speed V2.

When it is determined in step S60 that the end point speed $v_i$ does not fall within the speed range R1, i.e., when a result of the determination is negative (NO), the automatic travel control device proceeds to step S70. Then, in step S70, the automatic travel control device 30 instructs the control device 20 to cause the vehicle 10 to travel in the short section $l_{i-1}$, in the manner of the target speed maintaining travel.

When it is determined in step S60 that the end point speed $v_i$ falls within the speed range R1, i.e., when a result of the determination is positive (YES), the automatic travel control device proceeds to step S80. Then, in step S80, the automatic travel control device 30 instructs the control device 20 to cause the vehicle 10 to travel in the short section $l_{i-1}$, in the manner of the inertial travel.

When the processing of step S70 and step S80 is completed, the automatic travel control device returns to START and the automatic travel method starts next determination.

According to the automatic travel control device 30 of the vehicle 10 and the automatic travel method of the vehicle 10, it is possible to accurately calculate the end point speed $v_i$ at the end point $P_i$ when the vehicle 10 is controlled to perform the inertial travel in the short section $l_i$, from the change in the energy E of the vehicle 10 in the short section $l_i$ by the equation (1) based on the energy conservation law. Also, it is possible to calculate the acceleration a of the vehicle 10 in the short section $l_i$ and to accurately calculate the end point speed $v_i$ when the vehicle 10 is controlled to perform the inertial travel in the short section $l_i$ by the equation (2) based on the motion equation. Thereby, even when the vehicle 10 is controlled to perform inertial travel, it is possible to prevent the vehicle from deviating from the set speed range R at an early stage, thereby increasing the distance to be traveled by the inertial travel and effectively improving the fuel economy.

In the meantime, the end point speed $v_i$ calculated by the equation (1) based on the energy conservation law is more preferable than the end point speed $v_i$ calculated by the equation (2) based on the motion equation because the accuracy is higher. The reason is that in the equation (2) based on the motion equation, the speed when the vehicle 10 is controlled to perform the inertial travel is assumed constant, in addition to the air resistance force Fa. It cannot be said that the speed when the vehicle is controlled to perform the inertial travel in the short section $l_i$ is always constant, like the average speed V. Therefore, it is possible to more accurately calculate the end point speed $v_i$ by the equation (1) based on the energy conservation law, which is advantageous to improve the fuel economy.

Figure 5:
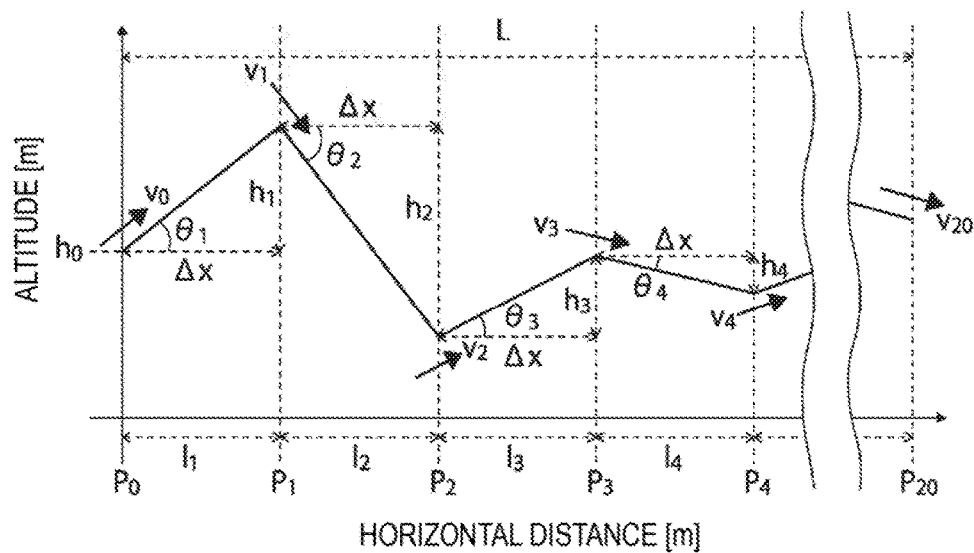
FIG. 5 illustrates a long section in which a plurality of the short sections of FIG. 2 is continuous.

FIG. 5 depicts a long section L having a plurality of continuous short sections $l_1$ to $l_n$. In FIG. 5, a variable n is set to 1 to 20.

In the automatic travel control device 30, as long section setting means, the navigation system 36 in which a long section L having a plurality of continuous short sections $l_1$ to $l_n$ is set is provided. The automatic travel control device 30 is preferably configured to calculate the end point speeds $v_1$ to $v_n$ in each of the short sections $l_1$ to $l_n$ of the long section L and to determine whether all the end point speeds $v_1$ to $v_n$ fall within the speed range R1 and performs control of causing the vehicle 10 to perform the inertial travel in the long section L when it is determined that all the end point speeds $v_1$ to $v_n$ fall within the speed range R1.

Each of the short sections $l_1$ to $l_n$ is a section having a preset horizontal distance $\Delta x$. The horizontal distance $\Delta x$ is preferably set to a distance in which the vehicle 10 is to travel for unit time of the target speed V1. For example, when the target speed V1 is 90 km/h, each short section is set to 25 m that is a distance in which the vehicle is to travel for unit time. In this way, the end point speed $v_i$ is calculated in each distance traveled for unit time of the target speed V1, so that it is possible to cope with a slight change in the slope $\theta_i$, which is advantageous to improve the precision. In the meantime, the horizontal distance $\Delta x$ may be set to a distance in which the vehicle 10 is to travel for unit time by the average speed V when the vehicle 10 is controlled to perform the inertial travel.

The long section L is a section having the plurality of continuous short sections $l_1$ to $l_n$ and a preset horizontal distance $\Delta y$. The horizontal distance $\Delta y$ of the long section L is preferably a value that the short sections $l_1$ to $l_n$ of at least 20 sections are continuous. For example, when the horizontal distance $\Delta x$ of the short section is 25 m, the horizontal distance of the long section is set to 500 m or longer. However, when the horizontal distance $\Delta y$ of the long section L is set to be excessively long, since an opportunity of the inertial travel decreases, the horizontal distance is set to 2000 m or shorter.

In the calculations of the end point speeds $v_1$ to $v_n$ in the long section L, the start point speeds $v_1$ to $v_{n-1}$ are used as the calculated end point speeds $v_1$ to $v_{n-1}$.

In a case where all the end point speeds $v_1$ to $v_n$ of the long section L calculated as described above fall within the speed range R1, the vehicle 10 is controlled to perform the inertial travel in the long section L, so that the distance to be traveled by the inertial travel is increased, which is advantageous to improve the fuel economy.

In the meantime, in a case of calculating the end point speeds $v_1$ to $v_n$ in the long section L, the altitude at the start point $P_0$ in the first short section $l_i$ is preferably set to zero.

Figure 6:
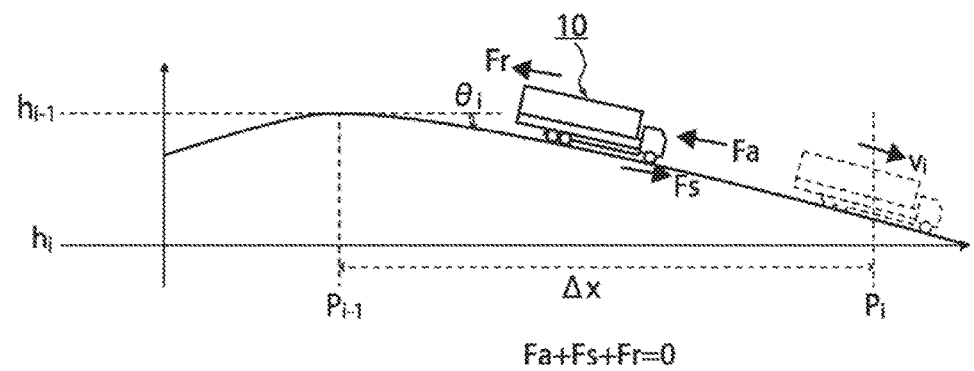
FIG. 6 illustrates an example of means for calculating a balanced slope in the automatic travel control device of FIG. 1.

FIG. 6 depicts the short section $l_i$, which is a descending road of which the slope $\theta_i$ is negative and in which the air resistance force Fa, the rolling resistance force Fr and the slope resistance force Fs to be applied to the vehicle 10 are balanced.

When the air resistance force Fa, the rolling resistance force Fr and the slope resistance force Fs, which are to be applied to the vehicle 10 when the vehicle 10 is controlled to perform the inertial travel in the short section $l_i$, are balanced, it corresponds to a case where the vehicle travels in the short section $l_i$, which is a descending road of which the slope $\theta_i$ is negative. In this case, the speed of the vehicle 10 does not increase even when the short section is the short section $l_i$ of a descending road.

For this reason, when a next short section $l_{i+1}$ of the short section $l_i$ of a descending road is a short section $l_{i+1}$ of an ascending road, there is a high possibility that the speed of the vehicle 10 will be lower than the lower limit speed V3.

Therefore, preferably, the automatic travel control device 30 includes, as balanced slope calculation means, means for calculating a balanced slope $\theta_{neut}$ at which the air resistance force Fa, the rolling resistance force Fr and the slope resistance force Fs, which are to be applied to the vehicle 10 when the vehicle 10 is controlled to perform the inertial travel in the short section $l_i$, are balanced, and as balance determination means, means for determining whether an absolute value of the negative slope $\theta_i$ of the short section $l_i$ of the descending road is smaller than an absolute value of the balanced slope $\theta_{neut}$, and performs control of approximating the lower limit speed V3 to the target speed V1 in a case where the absolute value of the slope $\theta_i$ is smaller than the absolute value of the balanced slope $\theta_{neut}$.

The balanced slope $\theta_{neut}$ is a slope at which the air resistance force Fa, the rolling resistance force Fr and the slope resistance force Fs to be applied to the vehicle 10 are balanced, and is expressed by an equation (10) obtained by substituting the equations (6), (7) and (9) into Fa+Fr+Fs=0.

[equation 10]

$$\sin\left(\tan^{-1}\frac{\theta_{neut}}{100}\right) + \mu \cdot \cos\left(\tan^{-1}\frac{\theta_{neut}}{100}\right) = -\frac{\lambda \cdot V^2}{M} \quad (10)$$

When the equation (10) is arranged using a synthesis formula of a trigonometric function, the balanced slope $\theta_{neut}$ is expressed by an equation (3).

[equation 3]

$$\theta_{neut} = 100 \cdot \left\{ \tan\left[ \sin^{-1}\left( -\frac{\lambda \cdot v_{i-1}^2}{M \cdot \sqrt{1+\mu^2}} \right) - \sin^{-1}\left( \frac{\mu}{\sqrt{1+\mu^2}} \right) \right] \right\} \quad (3)$$

By using the balanced slope $\theta_{neut}$ calculated as described above, it is determined whether the absolute value of the slope $\theta_i$ in the short section $l_i$ of a descending road of which the slope $\theta_i$ is negative is smaller than the absolute value of the balanced slope $\theta_{neut}$. In the case of the slope $\theta_i$ that is smaller than the absolute value of the balanced slope $\theta_{neut}$, the lower limit speed V3 is approximated to the target speed V1, i.e., the start of the inertial travel is limited, so that it is possible to avoid a travel delay due to the speed decrease upon the inertial travel on a gentle descending road and an increase in fuel consumption upon return to the target speed maintaining travel.

Figure 7:
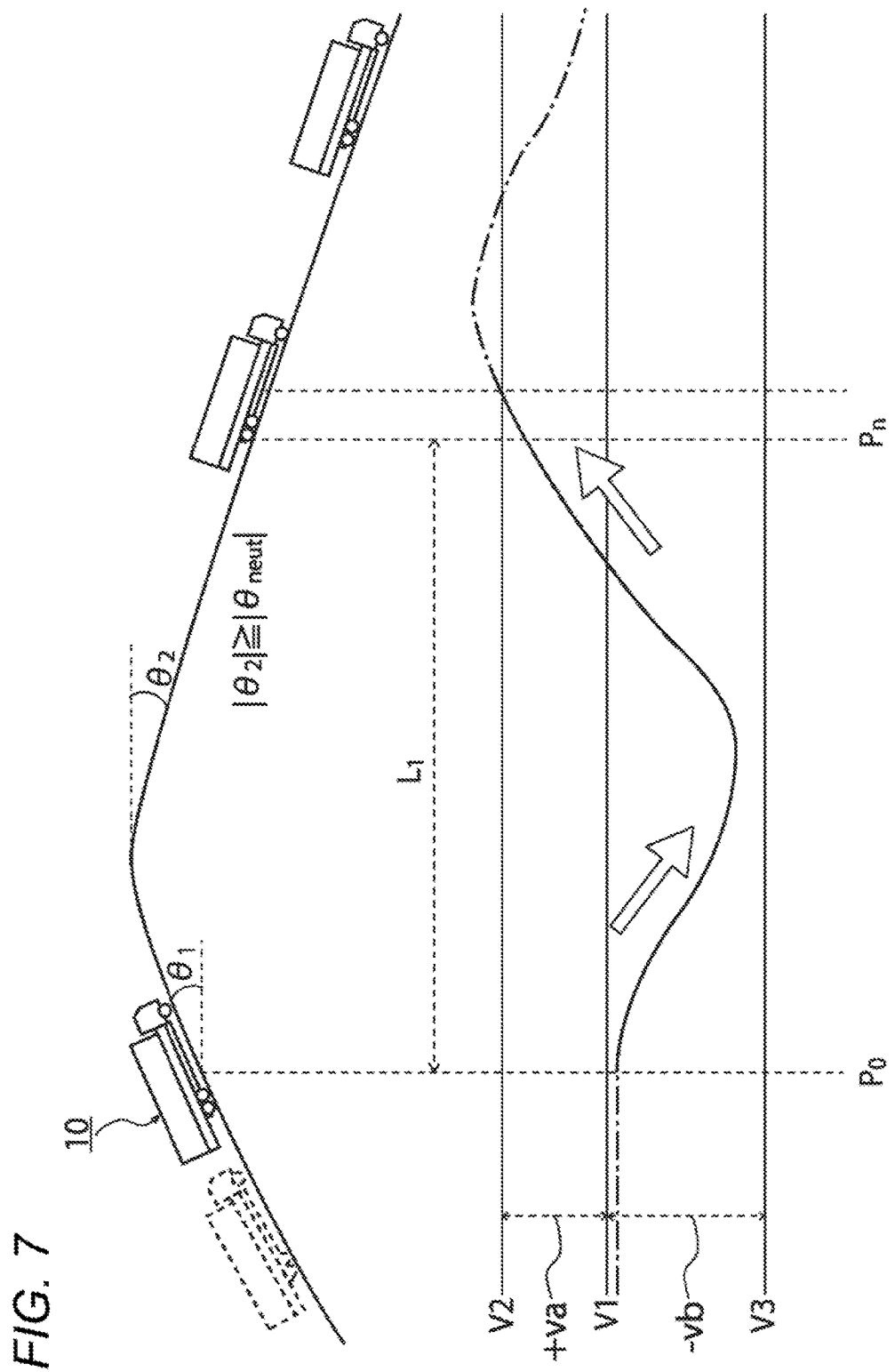
FIG. 7 illustrates an example of automatic travel of the vehicle of FIG. 1 and a relation between the automatic travel and a speed.
Figure 8:
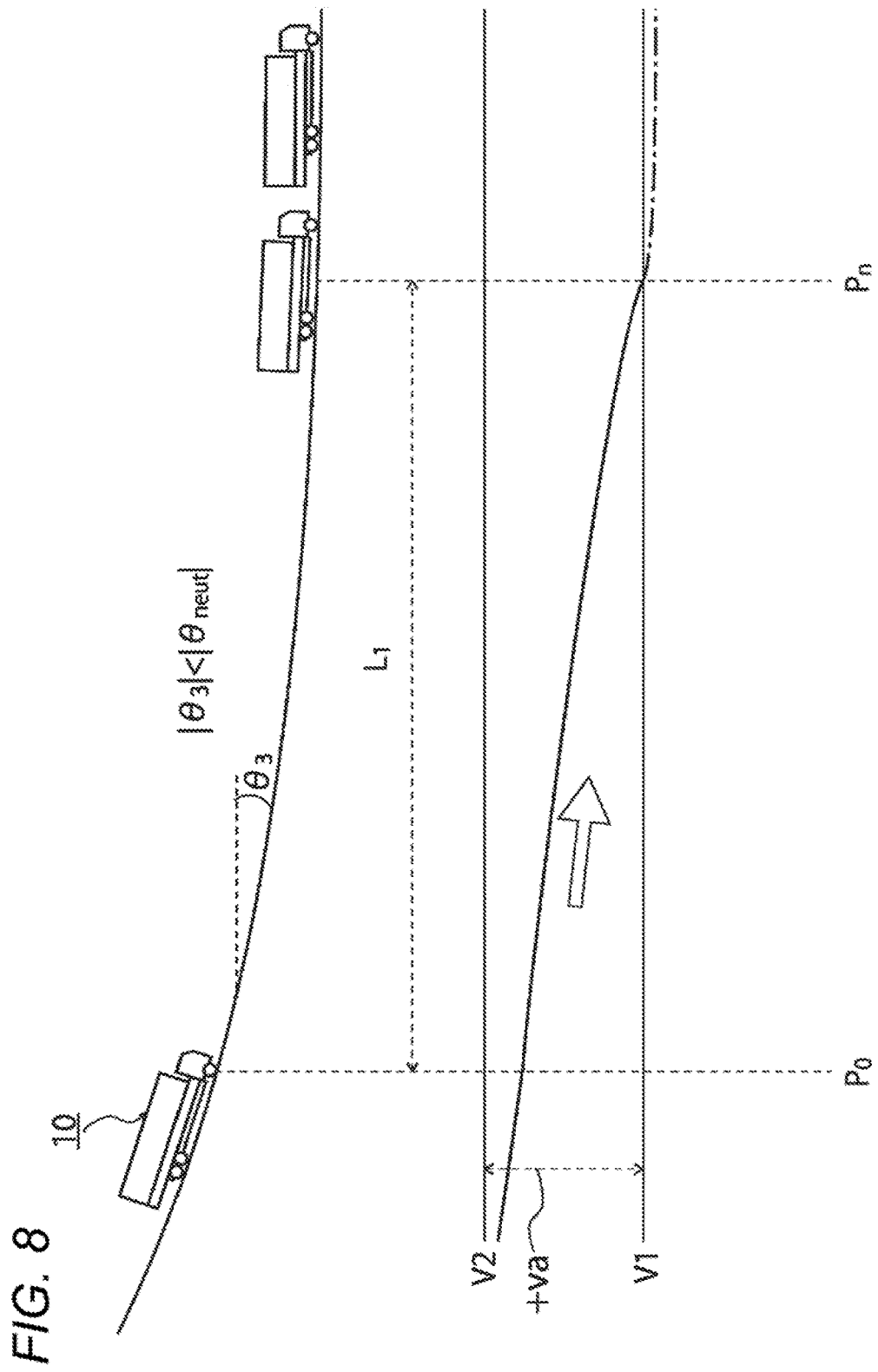
FIG. 8 illustrates another example of automatic travel of the vehicle of FIG. 1 and a relation between the automatic travel and a speed.

FIGS. 7 and 8 exemplify cases where the vehicle 10 is controlled to perform the automatic travel by the automatic travel control device 30 of the present invention. In the meantime, in FIGS. 7 and 8, a dashed-dotted line indicates the target speed maintaining travel and a solid line indicates the inertial travel.

FIG. 7 depicts a long section $L_1$ in which a descending road of which a slope $\theta_2$ is negative continues via a top after an ascending road of which a slope $\theta_1$ is positive. At a start point $P_0$ of the long section $L_1$, i.e., at a point short of the top, the automatic travel control device 30 calculates the end point speed $v_i$ in each short section $l_i$ of the long section $L_1$. Then, since it has been determined that all the end point speeds $v_i$ fall within the speed range R1, the automatic travel control device 30 causes the vehicle 10 to perform the inertial travel in the long section $L_1$. Also, since it has been determined that the absolute value of the slope $\theta_2$ is equal to or greater than the absolute value of the balanced slope $\theta_{neut}$, the automatic travel control device 30 causes the vehicle 10 to perform the inertial travel in the long section Lt while maintaining the lower limit speed V3 as it is.

Up to the top of the long section $L_1$, a speed of the vehicle 10 decreases to a speed in the vicinity of the lower limit speed V3. Then, when the vehicle passes the top, the speed of the vehicle 10 exceeds the target speed V1 and increases to the upper limit speed V2. Then, when the vehicle passes the end point $P_n$ of the long section $L_1$, since the speed of the vehicle 10 exceeds the upper limit speed V2, the inertial travel is ended and the vehicle 10 is controlled to perform the target speed maintaining travel.

At this time, in a case where the speed of the vehicle exceeds the upper limit speed V2, the vehicle may be switched to an acceleration-off inertial travel in which an engine brake is to be applied, without performing a neutral inertial travel in which the inertial travel is performed with the clutch 12 being disconnected until the speed exceeds the upper limit speed V2 or with the transmission 13 being at a neutral state. Here, the acceleration-off inertial travel indicates an inertial travel in which the vehicle 10 is controlled to perform the inertial travel while the vehicle is applied with a braking force by any one or a combination of a compression release brake of avoiding generation of energy to be applied in a direction of rotating the crankshaft and thus increasing a braking force by escaping a high pressure to be generated in a compression stroke of the engine 11, an exhaust brake of closing a shutter valve provided in an exhaust passage and an engine brake of enabling the vehicle to travel with fuel injection of the engine 11 being stopped upon acceleration-off.

When using the acceleration-off inertial travel, the vehicle 10 is applied with an engine brake force Ff, in addition to the air resistance force Fa, the rolling resistance force Fr and the slope resistance force Fs. For this reason, the engine brake force Ff is preferably added to the equation (1) and the equation (2).

FIG. 8 depicts a long section $L_2$ in which a flat road continues after a descending road of which a slope $\theta_3$ is negative. At a start point $P_0$ of the long section $L_2$, i.e., at a point short of the flat road, the automatic travel control device 30 calculates the end point speed $v_i$ in each short section $l_i$ of the long section $L_2$, and causes the vehicle 10 to perform the inertial travel in the long section $L_2$ because it has been determined that all the end point speeds $v_i$ fall within the speed range R1. Also, since it has been determined that an absolute value of the slope $\theta_3$ is smaller than the absolute value of the balanced slope $\theta_{neut}$, the automatic travel control device 30 sets the lower limit speed V3 to the target speed V1, i.e., sets the speed decrease value –vb to zero and causes the vehicle 10 to perform the inertial travel in the long section $L_1$.

On the gentle descending road of which the slope $\theta_3$ is smaller than the balanced slope $\theta_{neut}$, the speed of the vehicle 10 is decreased to a speed in the vicinity of the target speed V1. Then, when the vehicle enters the flat road from the descending road, since the speed of the vehicle 10 exceeds the target speed V1, the inertial travel is ended and the vehicle 10 is controlled to perform the target speed maintaining travel.

As described above, according to the automatic travel control device 30 of the vehicle 10 and the automatic travel method of the vehicle 10 of the present invention, it is possible to accurately calculate the end point speed $v_i$ in a case where the vehicle 10 is controlled to perform the inertial travel in the short section $l_i$, based on the energy conservation law or the motion equation. Also, when the end point speed $v_i$ falls within the preset speed range R1, the vehicle is controlled to perform the inertial travel, and when the end point speed $v_i$ deviates from the speed range R1, the vehicle is controlled to perform the target speed maintaining travel. Thereby, even when the vehicle 10 is controlled to perform the inertial travel, it is possible to prevent the vehicle from deviating from the set speed range R1 at an early stage, thereby increasing the distance to be traveled by the inertial travel and effectively improving the fuel economy.

Also, in the case of the descending road of which the slope $\theta_i$ is negative, it is determined whether or not to accelerate the vehicle 10 upon the travel on the descending road by comparing the slope $\theta_i$ and the balanced slope $\theta_{neut}$. When the acceleration is not expected, the lower limit speed V3 is approximated to the target speed V1, so that it is possible to avoid the travel delay when the speed of the vehicle is reduced to the speed in the vicinity of the lower limit speed V3 and the increase in the fuel consumption when the vehicle is returned to the target speed maintaining travel.

Also, the end point speeds $v_1$ to $v_n$ in each of the short section $l_1$ to $l_n$ of the long section L are calculated and it is determined whether all the end point speeds $v_1$ to $v_n$ fall within the speed range R1. Thereby, the vehicle 10 is controlled to perform the inertial travel over the longer distance than the related art, which is advantageous to improve the fuel economy.

The automatic travel control device 30 may include, instead of the slope acquisition means, altitude acquisition means for acquiring the end point altitude $h_i$ at the end point $P_i$ based on the start point altitude $h_{i-1}$ at the start point $P_{i-1}$, and may be configured to express the slope $\theta_i$ by a relation between the horizontal distance $\Delta x$ and the end point altitude $h_i$. In this case, preferably, absolute altitudes at respective points are stored and used in the data of the navigation system 36. Also, the absolute altitudes at respective points may be stored and used in the drive recorder 37.

REFERENCE SIGNS LIST

10: vehicle
11: engine
12: clutch
13: transmission
20: control device
26: vehicle speed sensor
27: acceleration sensor
30: automatic travel control device
31: automatic travel setting device
32: automatic travel switch
33: target vehicle speed setting device
34: increase/decrease value setting device
35: global positioning system
36: navigation system
37: drive recorder
E: energy
$E_i$: end point energy
$E_{i-1}$: start point energy
$E_{loss}$: loss energy
Fa: air resistance force
Fr: rolling resistance force
Fs: slope resistance force
L: long section
$P_i$: end point
$P_{i-1}$: start point
R1: speed range
a: acceleration
$l_i$: short section
$v_i$: end point speed
$v_{i-1}$: start point speed
$\Delta x$: horizontal distance
$\theta_i$: slope

The invention claimed is:

1. A vehicle automatic travel control device provided on a vehicle having an internal combustion engine and controlling the vehicle to automatically travel in a short section, in which a horizontal distance from a start point to an end point in front of the vehicle is preset, while maintaining a speed of the vehicle within a speed range which is faster than a lower limit speed set to be slower than a preset target speed and is slower than an upper limit speed set to be faster than the target speed, the vehicle automatic travel control device comprising:
a memory; and
a processor coupled to the memory, the processor configured to execute instructions stored in the memory to:
calculate an end point speed, which is a vehicle speed at the end point in a case where it is assumed that the vehicle is controlled to perform inertial travel in the short section, based on a relationship between potential energy and kinetic energy of the vehicle at the start point, potential energy and kinetic energy of the vehicle at the end point and loss energy of the vehicle to be lost from the start point to the end point or an acceleration of the vehicle in the short section;
determine whether the calculated end point speed falls within the speed range,
wherein the vehicle is controlled to perform the inertial travel in the short section in a case where the end point speed falls within the speed range;
calculate a balanced slope at which an air resistance force, a rolling resistance force, and a slope resistance force, which are to be applied to the vehicle in a case where it is assumed that the vehicle is controlled to perform the inertial travel in the short section, are balanced; and
determine whether an absolute value of a negative slope of the short section of a descending road is smaller than an absolute value of the balanced slope,
wherein, in a case where it is determined that the absolute value of the slope is smaller than the absolute value of the balanced slope, control of approximating the lower limit speed to the target speed is performed.

2. The vehicle automatic travel control device according to claim 1, wherein the processor is further configured to:
calculate the acceleration of the vehicle based on a resistance force to be applied to the vehicle from the start point to the end point and to calculate the end point speed based on the calculated acceleration.

3. The vehicle automatic travel control device according to claim 1, wherein the processor is further configured to:
acquire a weight of the vehicle;
acquire a start point speed, which is a speed of the vehicle at the start point; and
acquire a slope of the short section and a slope of a previous short section of the short section,
wherein the end point speed is also calculated by using the weight, the start point speed, the slopes and the horizontal distance.

4. The vehicle automatic travel control device according to claim 3, wherein the processor is further configured to:
calculate the end point speed by an equation (1) described below, where the weight is denoted with M, the start point speed is denoted with $v_{i-1}$, the end point speed is denoted with $v_i$, the slope of the short section is denoted with $\theta_i$, the slope of the previous short section of the short section is denoted with $\theta_{i-1}$, the horizontal distance is denoted with $\Delta x$, a preset air resistance coefficient is denoted with $\lambda$ and a preset rolling resistance coefficient is denoted with $\mu$

[equation 1]

$$v_i = \sqrt{\frac{2}{M} \cdot \left\{\frac{1}{2} \cdot M \cdot v_{i-1}^2 + M \cdot g \cdot \Delta x \cdot \frac{\theta_{i-1}}{100} - M \cdot g \cdot \Delta x \cdot \frac{\theta_i}{100}\right\} - \left[\lambda \cdot v_{i-1}^2 \cdot g + \mu \cdot M \cdot g \cdot \cos\left(\tan^{-1}\frac{\theta_i}{100}\right)\right] \cdot \Delta x \cdot \sqrt{1 + \left(\frac{\theta_i}{100}\right)^2}} \quad (1)$$

5. The vehicle automatic travel control device according to claim 3, wherein the processor is further configured to:
calculate the end point speed by an equation (2) described below, where the weight is denoted with M, the start point speed is denoted with $v_{i-1}$, the end point speed is denoted with $v_i$, the slope is denoted with $\theta_i$, the horizontal distance is denoted with Δx, a preset air resistance coefficient is denoted with λ and a preset rolling resistance coefficient is denoted with μ

[equation 2]

$$v_i = v_{i-1} - \left\{ \frac{\lambda \cdot v_{i-1}^2 \cdot g + \mu \cdot M \cdot g \cdot \cos\left(\tan^{-1}\frac{\theta_i}{100}\right) + M \cdot g \cdot \sin\left(\tan^{-1}\frac{\theta_i}{100}\right)}{M} \right\} \cdot \frac{\Delta x \cdot \sqrt{1 + \left(\frac{\theta_i}{100}\right)^2}}{v_{i-1}}. \quad (2)$$

6. The vehicle automatic travel control device according to claim 1, wherein the processor is further configured to:
set a long section including a plurality of continuous short sections,
wherein the end point speed is calculated in each short section of the long section and the processor further configured to determine whether all the end point speeds fall within the speed range, and
wherein, in a case where it is determined that all the end point speeds fall within the speed range, the vehicle is controlled to perform the inertial travel in the long section.

7. The vehicle automatic travel control device according to claim 1,
wherein the horizontal distance of the short section is set to a distance in which the vehicle is to travel for unit time by the target speed.

8. The vehicle automatic travel control device according to claim 1, wherein the processor is further configured to:
calculate the balanced slope by an equation (3) described below, where the balanced slope is denoted with $\theta_{neut}$, a weight of the vehicle is denoted with M, a start point speed at the start point is denoted with $v_{i-1}$, a preset air resistance coefficient is denoted with λ and a preset rolling resistance coefficient is denoted with μ

[equation 3]

$$\theta_{neut} = 100 \cdot \left\{ \tan\left[ \sin^{-1}\left(-\frac{\lambda \cdot v_{i-1}^2}{M \cdot \sqrt{1+\mu^2}}\right) - \sin^{-1}\left(\frac{\mu}{\sqrt{1+\mu^2}}\right) \right] \right\}. \quad (3)$$

9. The vehicle automatic travel control device according to claim 1, the processor further configured to:
acquire a weight of the vehicle;
acquire a start point speed, which is a speed of the vehicle at the start point; acquire an end point altitude at the end point based on a start point altitude at the start point, wherein a slope is configured to be expressed by a relationship between the horizontal distance, the start point altitude and the end point altitude; and
calculate the end point speed by using the weight, the start point speed, a slope and the horizontal distance.

10. The vehicle automatic travel control device according to claim 1, wherein the vehicle is controlled to not perform normal travel in a case where the end point speed falls within the speed range.

11. A vehicle automatic travel method in which a vehicle having an internal combustion engine is controlled to automatically travel in a short section, in which a horizontal distance from a start point to an end point in front of the vehicle is preset, while maintaining a speed of the vehicle within a speed range that is faster than a lower limit speed set to be slower than a preset target speed and is slower than an upper limit speed set to be faster than the target speed, the vehicle automatic travel method comprising:
calculating an end point speed at the end point in a case where it is assumed that the vehicle is controlled to perform inertial travel in the short section, based a relationship between potential energy and kinetic energy of the vehicle at the start point, potential energy and kinetic energy of the vehicle at the end point and loss energy of the vehicle to be lost from the start point to the end point or an acceleration of the vehicle in the short section;
determining whether the calculated end point speed falls within the speed range;
controlling the vehicle to perform the inertial travel in the short section in a case where the end point speed falls within the speed range;
calculating a balanced slope at which an air resistance force, a rolling resistance force and a slope resistance force, which are to be applied to the vehicle in a case where it is assumed that the vehicle is controlled to perform the inertial travel in the short section, are balanced;
determining whether an absolute value of a negative slope of the short section of a descending road is smaller than an absolute value of the balanced slope; and
approximating the lower limit speed to the target speed in a case where it is determined that the absolute value of the slope is smaller than the absolute value of the balanced slope.

12. A vehicle automatic travel control device provided on a vehicle having an internal combustion engine and controlling the vehicle to automatically travel in a short section, in which a horizontal distance from a start point to an end point in front of the vehicle is preset, while maintaining a speed of the vehicle within a speed range which is faster than a lower limit speed set to be slower than a preset target speed and is slower than an upper limit speed set to be faster than the target speed, the vehicle automatic travel control device comprising:
a memory; and
a processor coupled to the memory, the processor configured to execute instructions stored in the memory to:
calculate an end point speed, which is a vehicle speed at the end point in a case where it is assumed that the vehicle is controlled to perform inertial travel in the short section, based on an acceleration of the vehicle in the short section;
determine whether the calculated end point speed falls within the speed range,
wherein the vehicle is controlled to perform the inertial travel in the short section in a case where the end point speed falls within the speed range;
calculate a balanced slope at which an air resistance force, a rolling resistance force, and a slope resistance force, which are to be applied to the vehicle in a case where it is assumed that the vehicle is controlled to perform the inertial travel in the short section, are balanced; and
determine whether an absolute value of a negative slope of the short section of a descending road is smaller than an absolute value of the balanced slope,
wherein, in a case where it is determined that the absolute value of the slope is smaller than the absolute value of the balanced slope, control of approximating the lower limit speed to the target speed is performed.

13. The vehicle automatic travel control device according to claim 12, wherein the processor is further configured to: calculate the acceleration of the vehicle based on a resistance force to be applied to the vehicle from the start point to the end point and to calculate the end point speed based on the calculated acceleration.

* * * * *